US012643156B2

(12) United States Patent
Grilli et al.

(10) Patent No.: US 12,643,156 B2
(45) Date of Patent: Jun. 2, 2026

(54) ACTIVE PIEZOELECTRIC TOOL, ACTIVE PIEZOELECTRIC DEVICE AND OPERATING METHOD OF THE ACTIVE PIEZOELECTRIC TOOL

(71) Applicant: NUOVO PIGNONE TECNOLOGIE—SRL, Florence (IT)

(72) Inventors: Marco Grilli, Florence (IT); Morando Bessi, Florence (IT); Niccolò Grossi, Florence (IT); Antonio Scippa, Florence (IT); Gianni Campatelli, Florence (IT); Benjamin Barbieri, Pontassieve (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 402 days.

(21) Appl. No.: 18/256,863

(22) PCT Filed: Dec. 10, 2021

(86) PCT No.: PCT/EP2021/025491
§ 371 (c)(1),
(2) Date: Jun. 9, 2023

(87) PCT Pub. No.: WO2022/128150
PCT Pub. Date: Jun. 23, 2022

(65) Prior Publication Data
US 2024/0024965 A1 Jan. 25, 2024

(30) Foreign Application Priority Data
Dec. 16, 2020 (IT) ........................ L02020000031043

(51) Int. Cl.
B23B 29/02 (2006.01)
B23B 27/00 (2006.01)
B23B 41/02 (2006.01)

(52) U.S. Cl.
CPC ............ *B23B 29/022* (2013.01); *B23B 41/02* (2013.01); *B23B 27/002* (2013.01);
(Continued)

(58) Field of Classification Search
CPC . B23B 27/002; B23B 29/022; B23B 2250/16; B23B 2251/70; B23B 2260/108;
(Continued)

(56) References Cited

U.S. PATENT DOCUMENTS 5,170,103 A 12/1992 Rouch et al.
5,913,955 A 6/1999 Redmond et al.
(Continued)

FOREIGN PATENT DOCUMENTS

CN 1874864 A 12/2006
CN 101267905 A 9/2008
(Continued)

*Primary Examiner* — Matthew P Travers
(74) *Attorney, Agent, or Firm* — Paul Frank + Collins P.C.

(57) ABSTRACT

A toolbar with a longitudinal axis and a machining tool for machining a workpiece, the toolbar comprising at least one accelerometer configured to generate an electric signal proportional to the velocity of the toolbar along a direction; at least one piezoelectric actuator; and a control logic unit, operatively connected to the at least one accelerometer and to the at least one piezoelectric actuator, wherein control logic unit is configured to drive the at least one piezoelectric actuator by a driving signal proportional to the velocity derived from at least one accelerometer adapted to compensate the torque and the vibrations on the toolbar.

17 Claims, 7 Drawing Sheets

(52) U.S. Cl.
CPC ....... *B23B 2250/16* (2013.01); *B23B 2251/70* (2013.01); *B23B 2260/108* (2013.01); *B23B 2260/1285* (2013.01)

(58) Field of Classification Search
CPC . B23B 2260/128–1285; B23B 2290/00; Y10T 408/76; Y10T 409/304312; F16F 15/18; B23C 5/003; B23C 2250/16
See application file for complete search history.

(56) References Cited

U.S. PATENT DOCUMENTS

| | | | |
|---|---|---|---|
| 5,938,503 A * | 8/1999 | Cook | B24B 49/16 |
| | | | 451/10 |
| 6,661,157 B1 | 12/2003 | Lundblad | |
| 6,925,915 B1 * | 8/2005 | Claesson | G05B 19/18 |
| | | | 82/904 |
| 7,340,985 B2 | 3/2008 | Claesson et al. | |
| 2002/0036091 A1 | 3/2002 | Claesson et al. | |
| 2005/0262975 A1 | 12/2005 | Lundblad | |
| 2006/0291973 A1 | 12/2006 | Claesson et al. | |
| 2007/0056414 A1 | 3/2007 | Saeterbo et al. | |
| 2018/0281074 A1 | 10/2018 | Eichelberger et al. | |
| 2019/0232377 A1 | 8/2019 | Ostling et al. | |
| 2022/0314382 A1 * | 10/2022 | Laporte | B23Q 1/70 |

FOREIGN PATENT DOCUMENTS

| | | | | | |
|---|---|---|---|---|---|
| CN | 102049545 A | 5/2011 | | | |
| CN | 105658360 A | 6/2016 | | | |
| CN | 107989958 A | 5/2018 | | | |
| CN | 207297591 U | 5/2018 | | | |
| CN | 109226795 A | 1/2019 | | | |
| KR | 20060103436 A | 9/2006 | | | |
| WO | WO-2016120488 A1 * | 8/2016 | | ....... | B23B 29/03457 |

* cited by examiner

Fcut

+

−

Fact

6

X

Ẋ

7

ACTIVE PIEZOELECTRIC TOOL, ACTIVE PIEZOELECTRIC DEVICE AND OPERATING METHOD OF THE ACTIVE PIEZOELECTRIC TOOL

TECHNICAL FIELD

The present disclosure concerns an active piezoelectric tool equipped with an embedded piezoelectric device adapted to dampen the machining vibrations caused by machining operations.

BACKGROUND ART

The onset of harmful vibrations is one of the main limitations to the performance of turning or boring processes, especially in machining tools that require the use of slender tools (e.g. deep boring). These effects cause also a reduction of the performances and the quality of internal boring operations, which instead are crucial for a set of components for example in turbomachinery, such as cases, cushions, cylinders for reciprocating compressors, and internal shaft machining.

Currently, chattering on finish surfaces obtained for instance by boring toolbar typically generates higher costs related to lower material removal and higher scrap rate.

Accordingly, an improved toolbar capable of compensating the vibrations generated by a tool, such as a boring toolbar, during the machining operations, which is able to compensate for any vibrations quickly and, from the data processing standpoint economically, would be welcomed in the technology.

SUMMARY

In one aspect, the subject matter disclosed herein is directed to develop an active machining tool capable of mitigating the harmful effects of vibrations in the machining, particularly with slender tools.

In another aspect, the subject matter disclosed herein concerns a toolbar for carrying out a machining operation to a workpiece. The toolbar embeds a piezoelectric device having two facing supports and one or preferably two accelerometers, configured to generate an electric signal proportional to the velocity of the toolbar, along one relevant direction. The piezoelectric device also comprises piezoelectric actuators arranged between the two supports, capable of elongating or retracting under a driving signal. The piezoelectric device also comprises a control logic unit configured to drive the piezoelectric actuators by a driving signal proportional to the velocity detected by the accelerometers adapted to compensate for the torque and the vibrations on the toolbar.

In another aspect, disclosed herein is a piezoelectric device comprising a first piezoelectric actuator aligned parallel with the longitudinal axis of the toolbar, and a second piezoelectric actuator aligned parallel with the longitudinal axis of the toolbar, wherein the first piezoelectric actuator, the second piezoelectric actuator, and the longitudinal axis lie on the same plane.

A further aspect of the present disclosure is that the first support and the second have the surface facing the other support having seats with a rounded or semispherical shape, wherein the ends of each piezoelectric actuator are housed in a respective seat of the first support and of the second support.

In another aspect, disclosed herein, the piezoelectric actuators comprise a first head and a second head, with a rounded shape or semispherical shape, respectively housed in a relevant seat of the supports.

In another aspect, disclosed herein is a method of compensating the torque and dampening the vibrations on a toolbar, wherein signals proportional to the velocity of the toolbar are received and amplified, and a driving signal for driving the piezoelectric devices is generated proportional to the velocity of the toolbar, to compensate the torque the toolbar is subject to during the machining operations, and to dampen the vibrations on the toolbar.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Machines for working metal, wood, and/or other materials are equipped with machining tools, such as boring toolbars. During the machining operations, due to the mechanical frictions, temperature, and other possible physical parameters, vibrations are generated that propagate through the machining tools. Such vibrations can deteriorate the quality of the machining, especially in slender tools. The present subject matter is directed to an active vibration dampening system, embedded in the machining tool, capable of dampening the vibration and compensate the torque generated on the tool. The vibration compensation device is capable of counteracting vibrations generated during cutting operations driving piezoelectric actuators and compensate the torque the tool undergoes. The solution aims at minimizing chattering in all the boring machining case of large casing.

Figure 1:
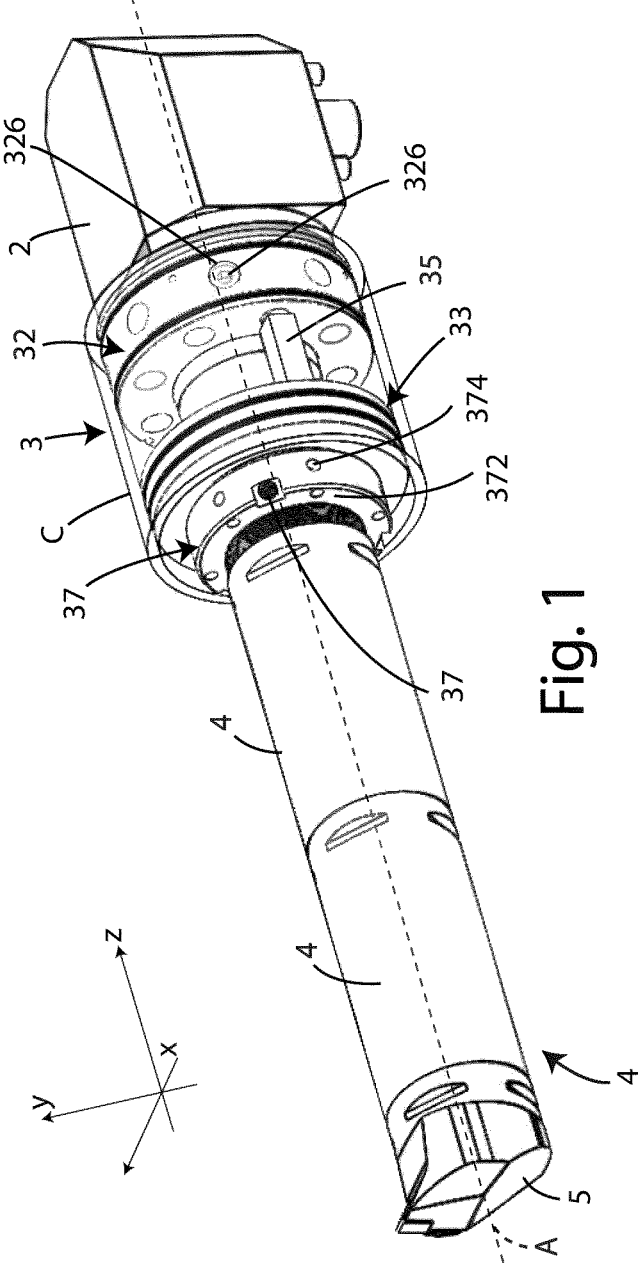
FIG. 1 illustrates a perspective view of a boring toolbar provided with an active piezoelectric device, according to a first embodiment.
Figure 2:
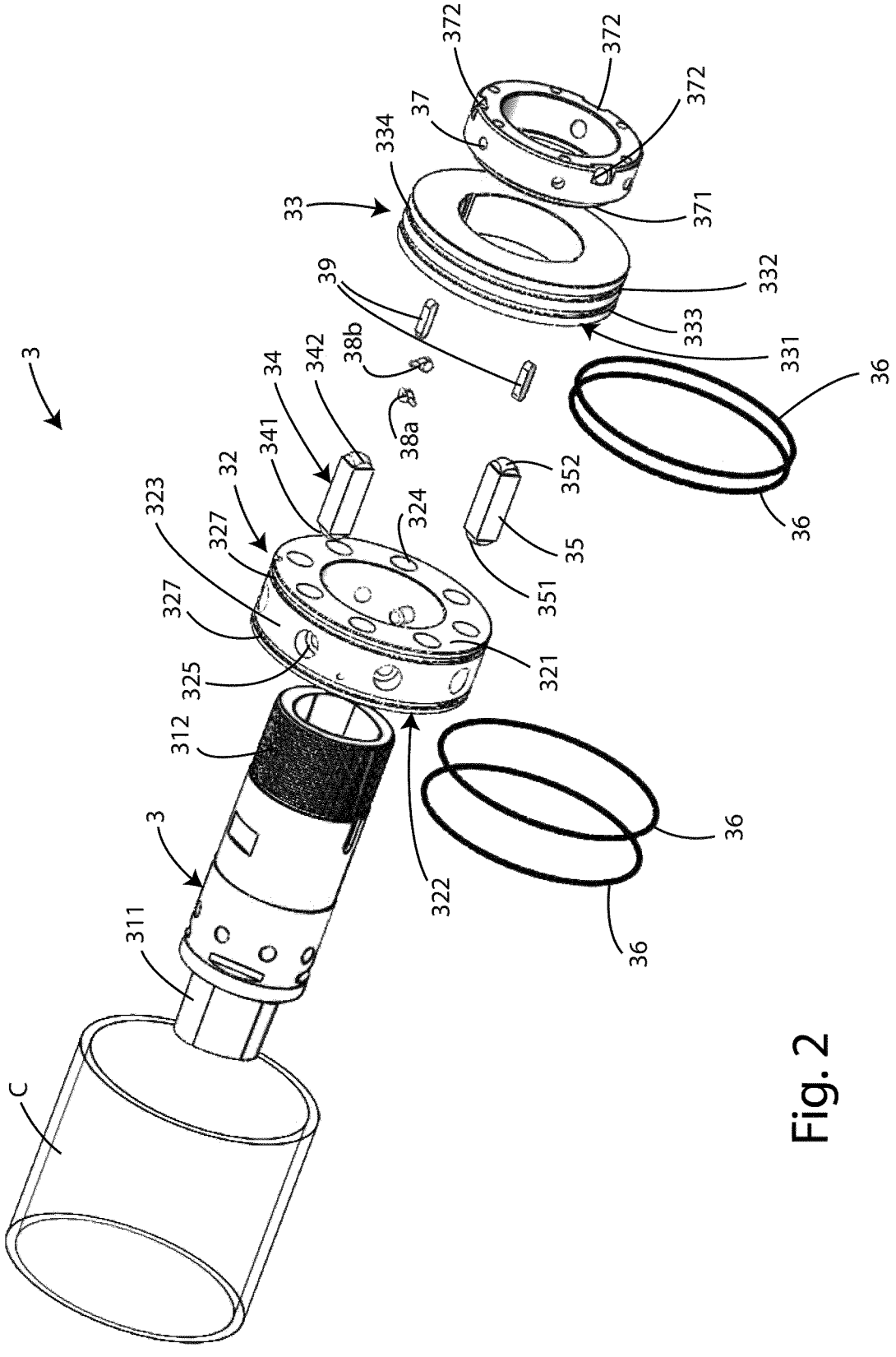
FIG. 2 illustrates an exploded view of the boring toolbar of FIG. 1.
Figure 3:
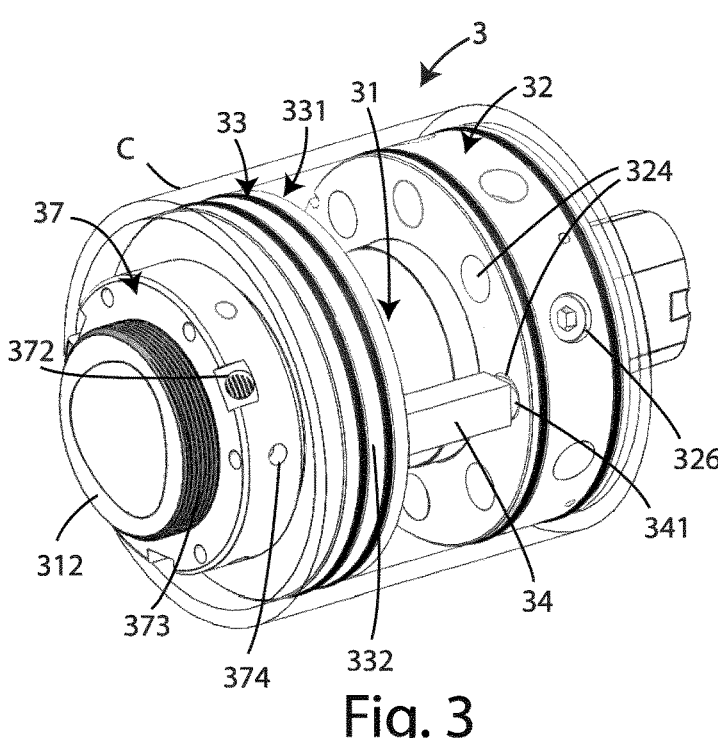
FIG. 3 illustrates a perspective view of the active piezoelectric device, according to the first embodiment.
Figure 4:
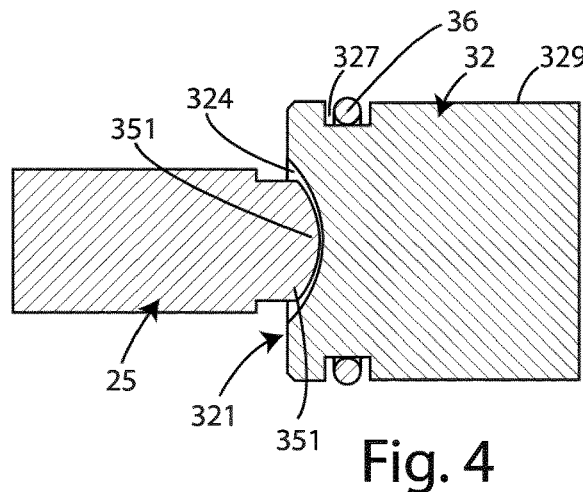
FIG. 4 illustrates a detail of the active piezoelectric device of FIG. 3.
Figure 5:
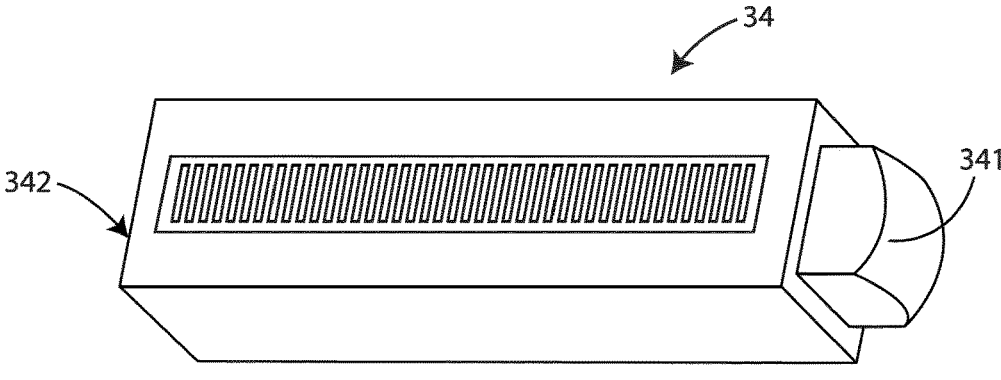
FIG. 5 illustrates a piezoelectric actuator of the active piezoelectric device according to the present disclosure.

Referring now to the drawings, FIG. 1 shows a machining tool, and in particular, a boring toolbar 1, which is a slender tool, and has a longitudinal axis A. The boring toolbar 1 comprises an adapter 2, connectable to the power take-off of the machine the boring toolbar 1 is installed, and in particular and in general, to a spindle. The boring toolbar 1 comprises an active piezoelectric device 3, described in detail below, and adapted to compensate the vibrations generated through the boring toolbar 1 during the operation of the latter, two extensions 4, connected consecutively, and a machining tool 5, which in the present embodiment is a boring bar for carrying out the machining operations on a metal workpiece. In other embodiments, the machining tool 5 can be any other machining tools, such as a milling tool, a drill bit, or the like.

In the embodiment shown in FIG. 1 the active piezoelectric device 3 is then embedded in a boring toolbar 1, however, it is possible to install the active piezoelectric device 3 in other machining equipment.

The adapter 2 usually depends on the machine the boring toolbar 1 has to be installed. It allows the boring toolbar 1 to be connected to a spindle, to take the power required to drive the machining tool 5, to carry out the required machining operations.

Referring to FIGS. 2, 3, 4, and 5, and with continued reference to FIG. 1, the active piezoelectric device 3 comprises a frame 31, having a in this embodiment a substantially cylindrical shape. The frame 31 is also hollow and has an upper portion 311 and a lower portion 312, which is threaded.

The active piezoelectric device 3 also comprises a first support or ring 32, coupled to the upper portion 311 of the frame 31, and a second support or ring 33, coupled to the lower portion of the 312 of the frame 31.

The first ring 32 has a first surface 321, which is flat and arranged faced to the second ring 33. The first surface 321 has a plurality of perimetral seats 324. In this embodiment, the number or the perimetral seats 324 are eight, but a different number of seats 324 can be foreseen. The seats 324 are semi-spherical, as will be better explained below. The first ring 32 also has a second surface 322, opposite to the first surface 321. The first ring 32 also has an external surface 323, having in its turn, in the present embodiment, a cylindrical shape, on which a plurality of threaded holes 325 are obtained. The threaded holes 325 are intended to be engaged each with a relevant grain 326, to fix the first ring 32 to the upper portion 311 of the frame 31. On the external surface of the first ring 32 two perimetral grooves 327 are obtained.

On the surface 331 facing the first ring 32, the second ring 33 has perimeter seats 332 (visible in transparency in FIG. 3), analogous to the perimetral seats of the first ring 32, having a semi-spherical shape. The second support or ring 33 also has an external surface 333, having in the present embodiment a cylindrical shape, on which two perimetral grooves 334 are obtained.

The active piezoelectric device 3 further comprises a pair of piezoelectric actuators, more specifically a first piezoelectric actuator 34, having a first head 341 and a second head 342, with a rounded shape or semispherical shape, and a second piezoelectric actuator 35, having, in its turn, a first head 351 and a second head 352, still with a rounded shape or semispherical shape. Both the piezoelectric actuators 34 and have an elongated shape.

The piezoelectric actuators 34 and 35 are both arranged between the first 32 and the second 33 rings. More specifically, each piezoelectric actuator 34 and 35 has the first head, respectively indicated with reference numbers 341 and 351, coupled to said first ring 32, housed in one respective perimeter seat 324; and the second head, respectively indicated with reference numbers 342 and 352, coupled to said second ring 33, housed one respective perimeter seat 332.

The piezoelectric actuators 34 and 35 are arranged along the diameter line of said ring 32 or of said ring 33, so that they are both parallel to the frame 31 and the frame 31 is interposed between them. More specifically, it is considered the Cartesian frame of reference shown in FIG. 1, where the Z-axis is aligned with the longitudinal axis A of the boring toolbar 1 and the axis of the frame 31, the X-axis is perpendicular to the Z-axis, and the Y-axis is perpendicular to the Z-axis and the X-axis. In the boring toolbar 1 the two piezoelectric actuators 34 and 35 are arranged parallel to each other and parallel to the Z-axis (and therefore parallel to the frame 31), and both lie in the X-Z plane.

Each piezoelectric actuator 34 and 35 comprises a stack of single cells glued together, which makes it fragile to transverse shear forces. The semi-spherical shape of the perimetral seats 342 and 333 respectively of the first ring 32 and the second ring 33 allow a the housing of actuators equipped with ball tips that keeps bend and shear forces away from the piezo ceramics. The heads 341 and 342 of the first piezoelectric actuator 34, and the heads 351 and 352 of the second piezoelectric actuator 35, being rounded or semispherical, as mentioned above, are inserted into the perimetral seats 342 and 333, so that the contact happens in a little area (compared to the surface of the seat), thus not transferring significant shear forces to the actuators 34 or 35.

In other embodiments, the piezoelectric actuators 34 and 35 can be arranged in a different position with respect to the frame 31 an the X-Z plane. The advantages of this a specific arrangement will be better explained below.

The active piezoelectric device 3 also comprises four washers 36. Two of the four washers are arranged on the perimetral grooves 327 of the external surface 323 of the first ring 32. The other two washers are arranged on the perimetral grooves 334 of the external surface 333 of the second ring 33.

The active piezoelectric device 3 comprises also a locking ring 37, having a thread 371, engaged with the thread of the lower portion 312 of the frame 31. The locking ring 37 has also three threaded holes 372 (but a different number can be foreseen) intended to be engaged with a suitable grain 373, to fix the locking ring 37 with the lower portion 312 of the frame 31. The threaded holes 372 can be inclined, and then not perpendicular, with respect to the longitudinal axis A of the boring toolbar 1, for better fixing the locking ring 37 to the frame 31.

The locking ring 37 also has a set of blind holes 374, for allowing the rotation of the same with an external tool, like a key or the like. The locking ring 37 realizes a pre-load of the first piezoelectric actuator 34 and of the second piezoelectric actuator compressing both of them between the first 32 and the second 33 ring, and that such pre-load can be adjusted acting on the blind holes 374.

The active piezoelectric device 3 further includes a pair of accelerometers 38a and 38b, coupled on the external surface of the frame 31. Each accelerometer 38a and 38b are arranged close or in correspondence with a respective piezoelectric actuator 34 or 35. Also, a first accelerometer 38a is aligned along the Z-axis, so as to detect the velocity of the boring toolbar 1 along this direction, while a second accelerometer 38*b* is aligned along the X-axis, so as to detect the velocity of the boring toolbar 1 along this other direction.

The assembly of the active piezoelectric device 3 comprises a pair of keys 39, housed in suitable guides obtained on the second ring 33, to guide the second ring 33 along with the frame 31.

The active piezoelectric device 3 also comprises a control logic unit 6, housed within the frame 31, and operatively connected with the accelerometers 38*a* and 38*b*, and with the piezoelectric actuators 34 and 35.

The control logic unit 6 is provided with circuitry, configured to process the electric signals generated by the piezoelectric actuators 34 and 35 and the accelerometers 38*a* and 38*b*.

The active piezoelectric device 3 is protected by a Plexiglas cover C, which allows an operator to see through it, so as to check the system contained within, although in other embodiments the cover C can be made also of different materials, depending on the working conditions.

Figure 6:
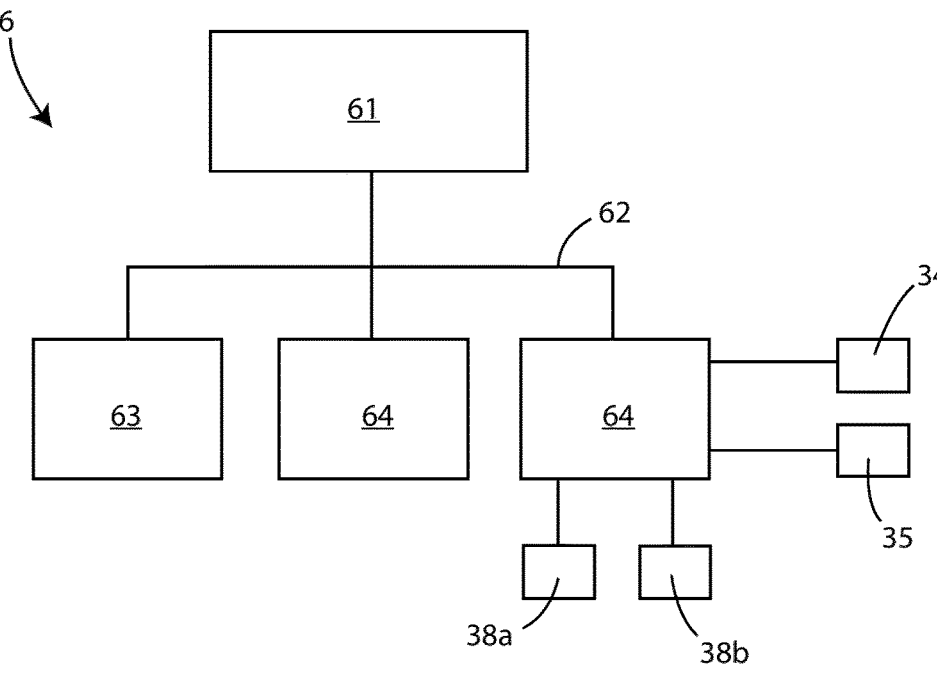
FIG. 6 illustrates a schematic of a control logic unit of the active piezoelectric device according to the present disclosure.

In some embodiments, and particularly referring to FIG. 6, the central control unit 6 may comprise a processor 61, a bus 62, to which the processor 61 is connected to, a database 63, connected to the bus 62, so as to be accessed and controlled by the processor 61, a computer-readable memory 64, also connected to the bus 62, so as to be accessed and controlled by the processor 61, a receiving-transmitting module 65, connected to the bus 62, configured to receive the signal from the accelerators 38*a* and 38*b*, and to transmit the controlling and driving signal to the first 34 and the second 35 piezoelectric actuator. The processor 61 can be embodied by a PLC, a microprocessor, or any other programmable microelectronic device.

The operation boring toolbar 1 of FIGS. 1, 2, 3, 4, 5, and 6 is as follows.

When the boring toolbar 1 is operating, the machining tool, namely the boring bar 5 (not shown in the figures) is coupled to the holder head 5, and receives the driving force from the head 2 of the machine.

During the machining operations, the accelerometers 38 detect the vibrations caused by the machining operations, which are mechanically transmitted through and over the entire boring toolbar 1. Also, referring to FIGS. 7 and 8 it can be seen that the boring toolbar 1 is subject to torque $T_{act}$ with respect to the longitudinal axis A of the boring toolbar 1.

Each accelerometers 38*a* and 38*b* generates an electric signal, proportional to the acceleration and velocity of the transmitted to the control logic unit 6, so as to be properly amplified and processed by the processor 61, whereby a driving signal is transmitted to both the first piezoelectric actuator 34 and the second piezoelectric actuator 35. The first 34 and the second 35 piezoelectric actuators are driven by a countersignal for dampening the vibrations generated by the machining process.

The accelerometer 38*a* and 38*b* of the dynamic of the boring toolbar 1 namely that the acceleration and then the velocity, along the Z-axis and X-axis, then, the signals generated by the accelerometers is properly amplified (the gain can be constant or time-dependent) and processed by the processor 61 of the control logic unit 1, so as to generate a control signal for each piezoelectric actuators 34 and 35, proportional, as mentioned above, to the velocity along the above-mentioned Z-axis and X-axis of the boring toolbar 1. The signals are generated in order to offset the torque $T_{act}$, generated along the longitudinal axis A of the boring toolbar

Figure 7:
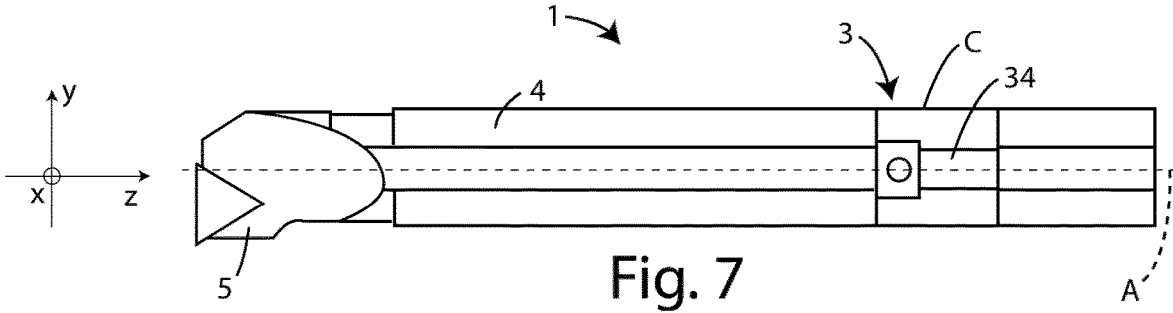
FIG. 7 illustrates a first side view of the boring toolbar according to the present disclosure in operation.
Figure 8:
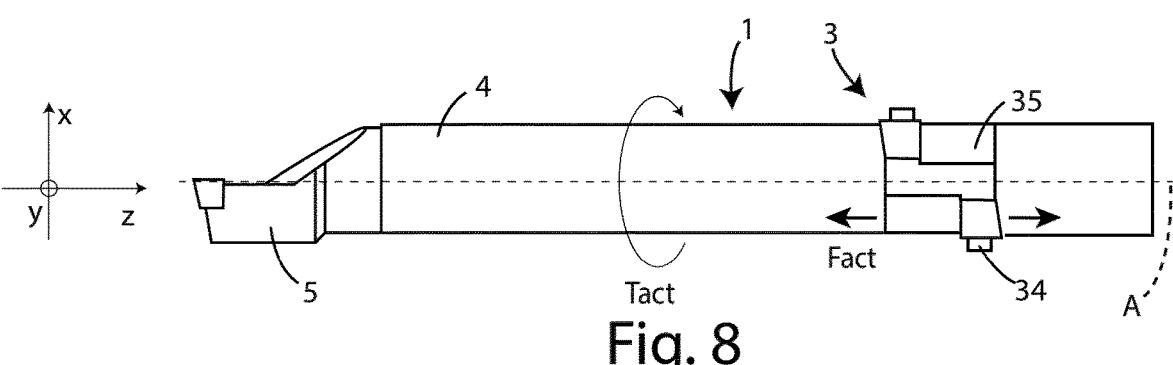
FIG. 8 illustrates a second side view of the boring toolbar according to the present disclosure in operation.
Figure 9:
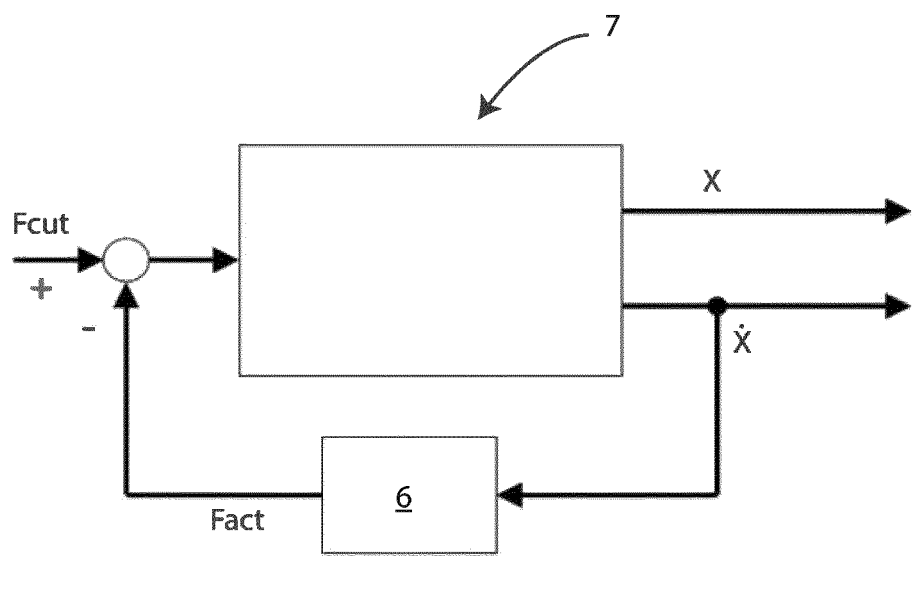
FIG. 9 illustrates a block diagram of the transfer system showing the parameter processed by the control logic unit according to the present disclosure.

1, which, as mentioned above, is parallel to the Z-axis of the Cartesian framework also shown in FIGS. 7 and 8.

In the present embodiment, the signal to drive the first 34 and the second 35 piezoelectric actuators also dampen the vibrations of the boring toolbar 1, and therefore of the active piezoelectric device 3. Hence, it is assumed a dampening force proportional to the velocity of the object to be dampened. The control logic unit 6 thus generates a control signal for achieving active damping.

In other words, the two piezoelectric actuators 34 and 35 are electrically stimulated by driving signals to elongate or retract based on the process response. The change in length of the first 34 and second 35 piezoelectric actuators along the toolbar longitudinal axis A, causes a distortion or bend of the boring toolbar 1 on the X-Z plane. These adjustments are intended to counteract the torque $T_{act}$ generated on the boring toolbar 1 by the cutting forces during the machining, therefore also dampening the vibrations. The accelerometers 38*a* and 38*b* connected to the control logic unit 6, gather direct velocity feedback, allowing continuous process monitoring and adjustments. When required, signals from the control logic unit 6 are sent to an amplifier which elongates or retracts the actuators 34 and 35 to counteract the cutting forces.

In the embodiment disclosed, a force proportional to the velocity is supplied. Thus, additional damping is substantially introduced into the dynamic system, which in fact is proportional to the velocity, as shown in the equation below:

$$Ma+Cv+Kx=F_{act}$$

where α is the acceleration, v is the velocity, x the displacement, M is the mass, C is the damping stiffness, and K is the stiffness. The additional damping makes it possible to reduce vibrations at frequencies close to resonance, as demonstrated by bench tests carried out.

The feedback control signal is then proportional to the velocity v of the machining tool, or, equivalently, of the active piezoelectric device 3.

In case of the piezoelectric device 3 is kept with only one piezoelectric actuator, the latter has to be placed eccentrically with respect to the longitudinal axis A of the boring toolbar 1, namely not lying along the longitudinal axis A, so that when it is elongated or retracted by the driving signal of the control logic unit 6 it can offset the torque $T_{act}$ the boring toolbar 1 is subject to during the machining operations.

Referring to FIG. 7, the feedback scheme is implemented by the central control unit 6, schematically showing that given the force $F_{cut}$ the boring toolbar 1 is subject to owing to the machining operations, which creates a torque $T_{act}$, the velocity $\dot{x}$ (namely v) detected by one of the accelerometers 38*a* and 38*b* along the relevant detection axis (Z or X), is processed by the central control unit 6, to generate a dumping activation force $F_{act}$, corresponding mainly to the term Cv of the equation above.

In the present embodiment, the control is always active and the actuation is appreciable only in case of high vibrations (high speeds). In other embodiments, it is possible to provide a trigger, so that the active piezoelectric device 3 operates only after that the velocity of the boring toolbar 1 crosses a certain threshold.

Figure 10:
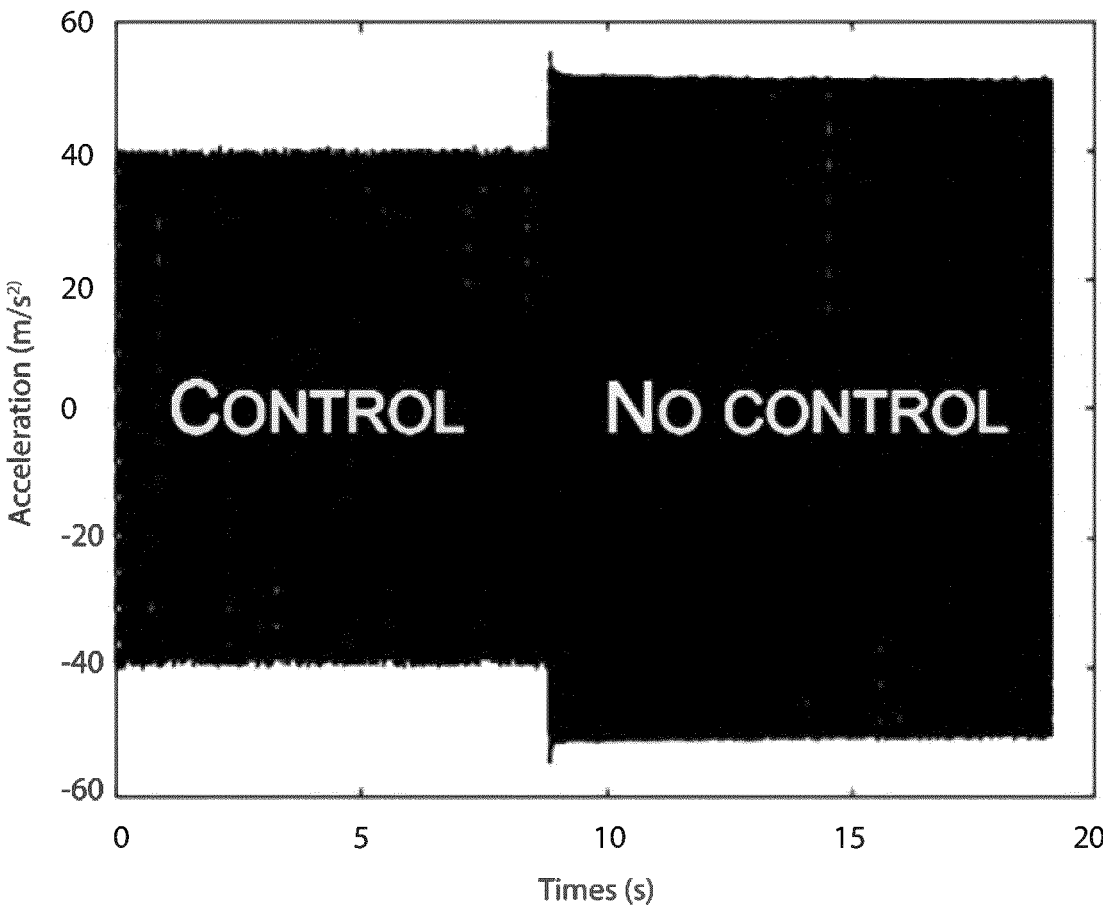
FIG. 10 illustrates a first graph of the acceleration of the boring toolbar as a function of the time in case of control of the vibration and in case of no control of the vibrations.
Figure 11:
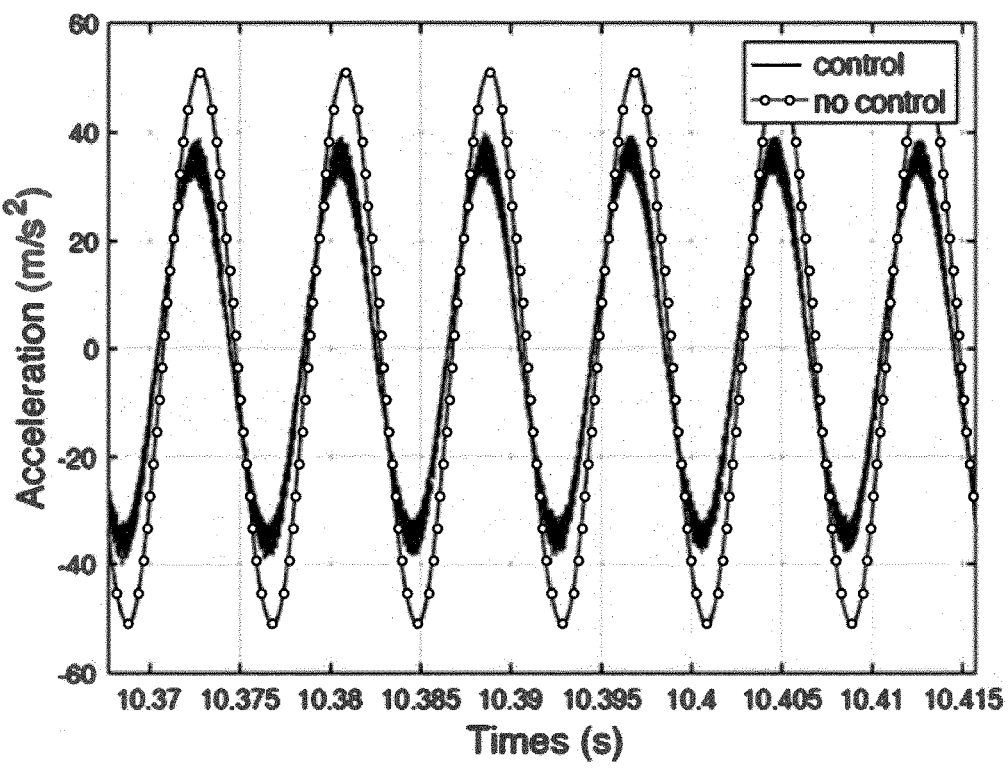
FIG. 11 illustrates a second graph of the acceleration of the boring toolbar as a function of the time in case of control of the vibration and in case of no control of the vibrations.
Figure 12:
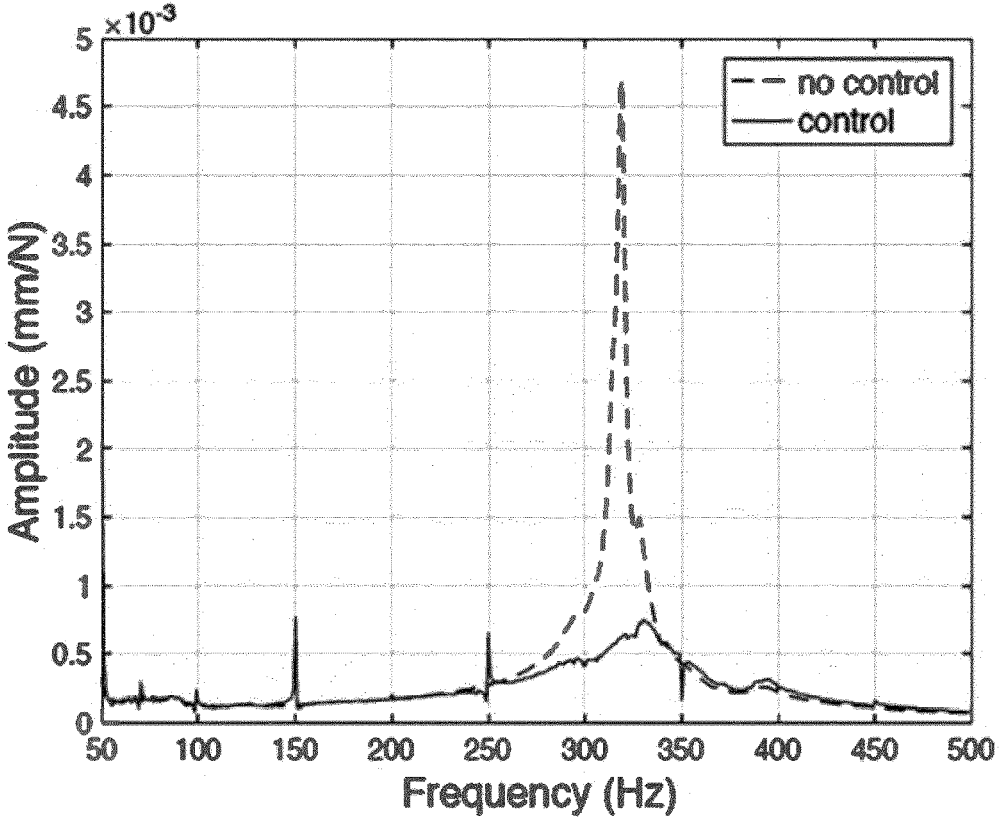
FIG. 12 illustrates a graph of the amplitude of the boring toolbar as a function of the frequency in case of control of the vibration and in case of no control of the vibrations.
Figure 13:
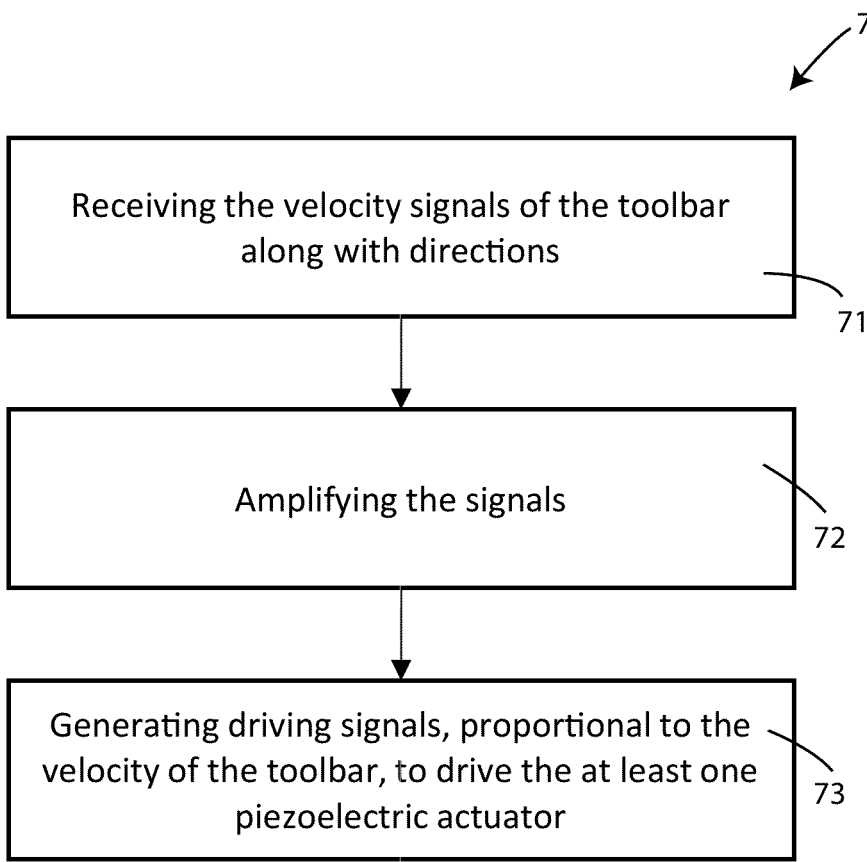
FIG. 13 illustrates a flow charts of the method of compensating the torque and dampening the vibrations according to the present disclosure.

Referring to FIGS. 10, 11, and 12, it is shown the results of the of measurements on a testbench to test the system behavior: both impact testing (FIG. 12) and sinusoidal excitation testing (FIGS. 10 and 11) results show the significant dampening effect achievable by the system. It is clear that in case of there was no dampening of the boring toolbar 1, there would be a remarkable increase in the amplitude of the acceleration signal with respect to particular working frequencies (i.e., natural frequency of the system), and in particular, in the case shown, on frequencies around 320 Hertz.

FIG. 12 shows a flowchart summarizing the steps carried out by the processor 61 of the central control unit 6, for driving the piezoelectric actuators 34 and 35. The method executed comprises the steps of receiving 71 the velocity signals from the accelerometers 38a and 38b. Said signals are directly generated by the accelerometers 38a and 38b and taken along the directions of the X-axis and the Z-axis. The signals are then amplified in step 72, by a suitable gain. Driving signals are then generated in step 73, proportional to the velocity of the toolbar 1, capable of compensating the torque $T_{act}$ with respect to the longitudinal axis A of the boring toolbar 1 and the vibrations on the toolbar 1.

An advantage of the solution active piezoelectric device 3 is that the control of the active piezoelectric device has the advantage of not needing any type of model or frequency response measurement (FRF) to be implemented.

Another advantage of the active piezoelectric tool is that it is capable of reducing machining time by increasing the material removal rate (MRR) and improve surface quality. This produces a benefit in terms of reduced machining costs per single component and increased part quality.

Another advantage of the subject matter disclosed herein is the reduction up to 80% on natural frequency peak when tap testing. Also, increased damping capabilities compared to current market solutions allow a higher material removal rate.

While aspects of the invention have been described in terms of various specific embodiments, it will be apparent to those of ordinary skill in the art that many modifications, changes, and omissions are possible without departing from the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A tool for carrying out a machining operation to a workpiece, the tool comprising:
   a toolbar comprising a longitudinal axis and a machining tool disposed on one end:

a first support;
   a second support;
   a piezoelectric device disposed between the first support and the second support;
   a control logic unit operatively connected to the piezoelectric device, and
   a frame having an upper portion and a lower portion,
   wherein the lower portion is threaded and rigidly connected to the machining tool,
   wherein the first support is coupled to the upper portion of the frame and the second support is engaged with the thread of the lower portion of the of the frame, and
   wherein the second support is arranged facing the first support;
   wherein the control logic unit is configured to generate a driving signal to drive the piezoelectric device, and
   wherein the driving signal is proportional to a velocity of the tool bar and causes the piezoelectric device to move an amount that compensates for torque and vibration on the toolbar.

2. The tool of claim 1, wherein the piezoelectric device is arranged eccentrically with respect to the longitudinal axis of the toolbar.

3. The tool of claim 1, further comprising:
   a locking ring having a thread engaged with the thread of the lower portion of the frame to realize a pre-load of the piezoelectric device that compresses the piezoelectric device between the first support and the second support.

4. The tool of claim 3, wherein the locking ring fixes to the lower portion of the frame.

5. The tool of claim 3, wherein the locking ring has at least one hole for allowing rotation of the locking ring.

6. The tool of claim 1, wherein the piezoelectric device comprises:
   a first piezoelectric actuator arranged between the first support and the second support and aligned parallel with the longitudinal axis of the toolbar; and
   a second piezoelectric actuator arranged between the first support and the second support, and aligned parallel with the longitudinal axis of the toolbar.

7. The tool of claim 6, wherein the first piezoelectric actuator, the second piezoelectric actuator, and the longitudinal axis lie on the same plane.

8. The tool of claim 1, further comprising:
   a first accelerometer arranged to measure acceleration and velocity of the toolbar along a first axis; and
   a second accelerometer arranged to measure acceleration and velocity of the toolbar along a second axis.

9. The tool of claim 8, wherein the first accelerometer and the second accelerometer are each arranged adjacent to the first piezoelectric actuator or the second piezoelectric actuator, respectively.

10. The tool of claim 1, further comprising:
   a first accelerometer arranged to measure acceleration and velocity of the toolbar along a first axis; and
   a second accelerometer arranged to measure acceleration and velocity of the toolbar along a second axis,
   wherein the piezoelectric device comprises:
      a first piezoelectric actuator arranged between the first support and the second support and aligned parallel with the longitudinal axis of the toolbar; and,
      a second piezoelectric actuator arranged between the first support and the second support and aligned parallel with the longitudinal axis of the toolbar, wherein the first piezoelectric actuator, the second piezoelectric actuator, and the longitudinal axis lie on the same plane, and wherein the first axis is parallel to the longitudinal axis of the toolbar and the second axis is perpendicular to the first axis and lies on a plane where the first piezoelectric actuator and the second piezoelectric actuator lie.

11. The tool of claim 1, wherein the piezoelectric device comprises actuators, and wherein the first support and the second support have surfaces that face each other, the surfaces having seats disposed therein to receive ends of the actuators.

12. The tool of claim 11, wherein the seats have a rounded or semispherical shape.

13. The tool of claim 1, further comprising:

extensions coupled with the frame at one end and to the machining tool to the other end.

14. The tool of claim 1, further comprising:

an adapter for connecting to a spindle of a working machine, wherein the piezoelectric device is arranged between the adapter and the machining tool.

15. The tool of claim 1, wherein the toolbar is a boring toolbar.

16. A method of compensating torque and dampening vibrations on the tool of claim 1, wherein the piezoelectric device comprises at least one piezoelectric actuator, wherein the method comprises the steps of: receiving velocity signals of the toolbar along with directions; amplifying the signals; and, generating driving signals, proportional to the velocity of the tool bar, to drive the at least one piezoelectric actuator for compensating the torque with respect to the longitudinal axis of the tool bar and the vibrations on the tool bar.

17. The method of claim 16, wherein the piezoelectric device comprises two piezoelectric actuators, arranged parallel to each other and parallel to the longitudinal axis of the toolbar, and wherein the piezoelectric device comprises two accelerometers, configured to detect the velocity of the toolbar along a first axis and a second axis, wherein the first axis is parallel to the longitudinal axis of the toolbar and the second axis is perpendicular to the first axis and lies on a plane where the piezoelectric actuators lie.

\* \* \* \* \*